No. 606,848. Patented July 5, 1898.
N. THERIEN.
TIRE FOR VEHICLE WHEELS
(Application filed July 17, 1897.)
(No Model.)
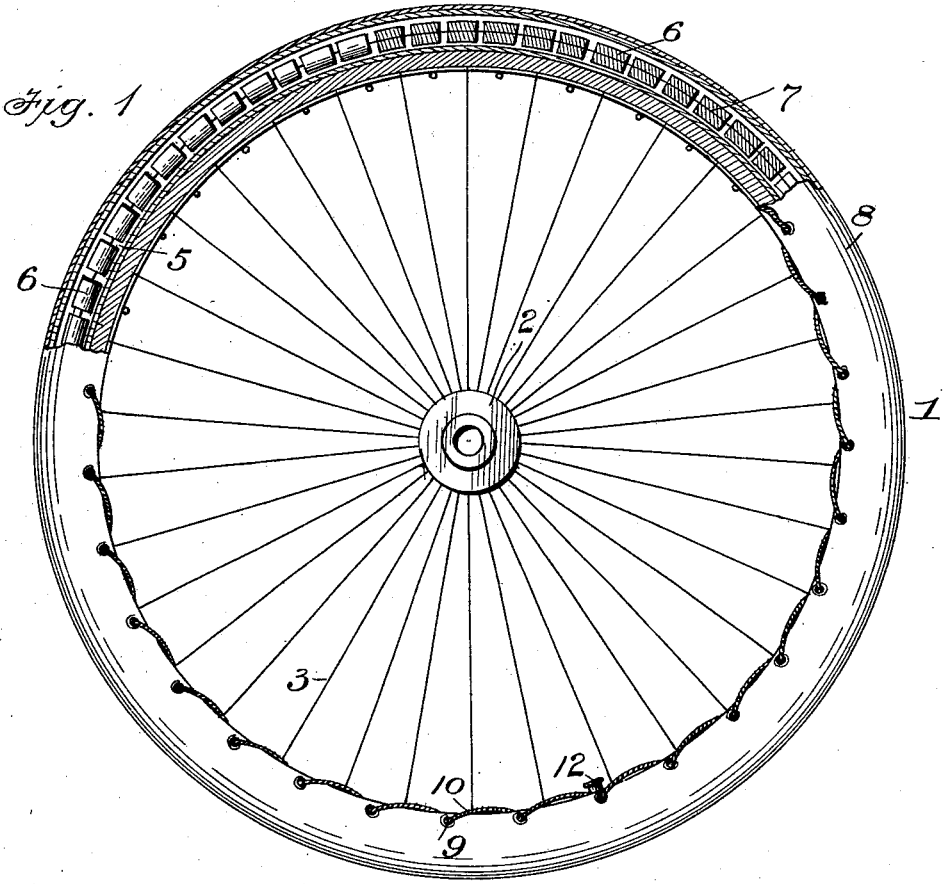
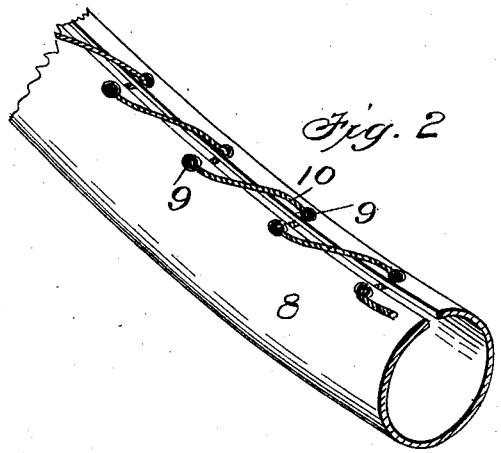
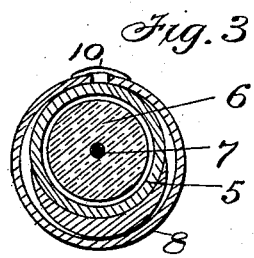
Witnesses:
Franck L. Ourand
Jos. L. Coombs
Inventor:
Nelson Therien
by Louis Bagger & Co.
Attorneys.

UNITED STATES PATENT OFFICE.

NELSON THERIEN, OF SOUTH CHICAGO, ILLINOIS, ASSIGNOR OF ONE-HALF TO CHARLES KROSCHER, OF SAME PLACE.

TIRE FOR VEHICLE-WHEELS.

SPECIFICATION forming part of Letters Patent No. 606,848, dated July 5, 1898.

Application filed July 17, 1897. Serial No. 644,982. (No model.)

*To all whom it may concern:*

Be it known that I, NELSON THERIEN, a citizen of the United States, and a resident of South Chicago, in the county of Cook and State of Illinois, have invented certain new and useful Improvements in Tires for Vehicle-Wheels; and I do hereby declare that the following is a full, clear, and exact description of the invention, which will enable others skilled in the art to which it appertains to make and use the same, reference being had to the accompanying drawings, which form a part of this specification.

My invention relates to tires for bicycle and other similar wheels; and its object is to provide an improved construction of the same which shall possess superior advantages with respect to efficiency in use.

The invention consists, essentially, in the combination, with a wheel-rim, of a pneumatic tube having a filling of corks strung upon a cord or wire and a shield surrounding said tube and rim having eyelets near its meeting edges and a lacing-cord engaging therewith, as hereinafter fully described and claimed.

In the accompanying drawings, Figure 1 is a side elevation of a wheel, partly broken away to show the interior construction. Fig. 2 is a detail perspective view showing a portion of the shield removed from the wheel. Fig. 3 is a detail cross-section of the rim and tire.

In the said drawings the reference-numeral 1 designates a bicycle-wheel comprising the hub 2, the spokes 3, and rim 4, which may be of any ordinary or suitable construction.

The numeral 5 designates a pneumatic tube or tire having a filling 6 of corks, which are strung upon a wire or cord 7. These corks should be somewhat smaller than the tube, so as to leave an air-space therebetween. Surrounding said tire or tube and the wheel-rim is a shield 8, consisting of a strip of canvas or other woven or textile material, having near its edges, which meet along the under side of the rim, a number of eyelets 9, through which passes a lacing-cord 10 for holding the shield in place.

The numeral 12 designates an inflation-valve.

In use the shield acts as a protector to the pneumatic tube or tire and obviates to a great degree liability of the tire being punctured, and when puncturing does happen the wheel will not be disabled, as it will then act as a cushion-tire, the corks being the cushions or filling.

Having thus fully described my invention, what I claim is—

In a wheel, the combination of the rim and the pneumatic tire secured thereto, of the corks located in said tire, isolated from each other and of a smaller diameter than the interior of the tire, so as to leave an air-space therebetween, the cord passing longitudinally through said corks and the shield of textile material surrounding the outer side of the tire and the inner side of the rim and the eyelets and lacing-cords, substantially as described.

In testimony that I claim the foregoing as my own I have hereunto affixed my signature in presence of two witnesses.

NELSON THERIEN.

Witnesses:
JNO. L. YOUNG,
JOHN KOWALSKI.